United States Patent [19]

Kimura

[11] Patent Number: 4,772,888

[45] Date of Patent: Sep. 20, 1988

[54] BUS STATE CONTROL CIRCUIT

[75] Inventor: Shinya Kimura, Tokyo, Japan

[73] Assignee: NEC Corporation, Tokyo, Japan

[21] Appl. No.: 898,667

[22] Filed: Aug. 21, 1986

[30] Foreign Application Priority Data

Aug. 21, 1985 [JP] Japan ................... 60-184723

[51] Int. Cl.[4] ............... H04Q 9/00; H03K 19/00
[52] U.S. Cl. .................. 340/825.500; 307/445;
307/480; 307/465
[58] Field of Search ........... 340/825.5, 825.22, 825.91,
340/825.83; 307/465, 445, 440, 480, 231, 510,
603, 595, 591; 364/716

[56] References Cited

U.S. PATENT DOCUMENTS

| | | | |
|---|---|---|---|
| 4,267,463 | 5/1981 | Mayumi | 307/465 |
| 4,562,427 | 12/1985 | Ecton | 340/825.5 |
| 4,575,794 | 3/1986 | Veneski et al. | 307/465 |
| 4,580,137 | 4/1986 | Fiedler et al. | 307/480 |

*Primary Examiner*—Donald J. Yusko
*Attorney, Agent, or Firm*—Sughrue, Mion, Zinn, Macpeak, and Seas

[57] ABSTRACT

A bus state control circuit controls the access operation on the basis of access request signals supplied thereto. The access of an input-output device starts after a predetermined time interval in the case when a previous access was made to the input-output device, while it starts immediately in the case when the previous access was made to a main memory device or when such access was made to the input-output device or such access was made to the input-output device but a predetermined time has passed at a point in time when the access request signal indicates the access of the input-output device.

6 Claims, 4 Drawing Sheets

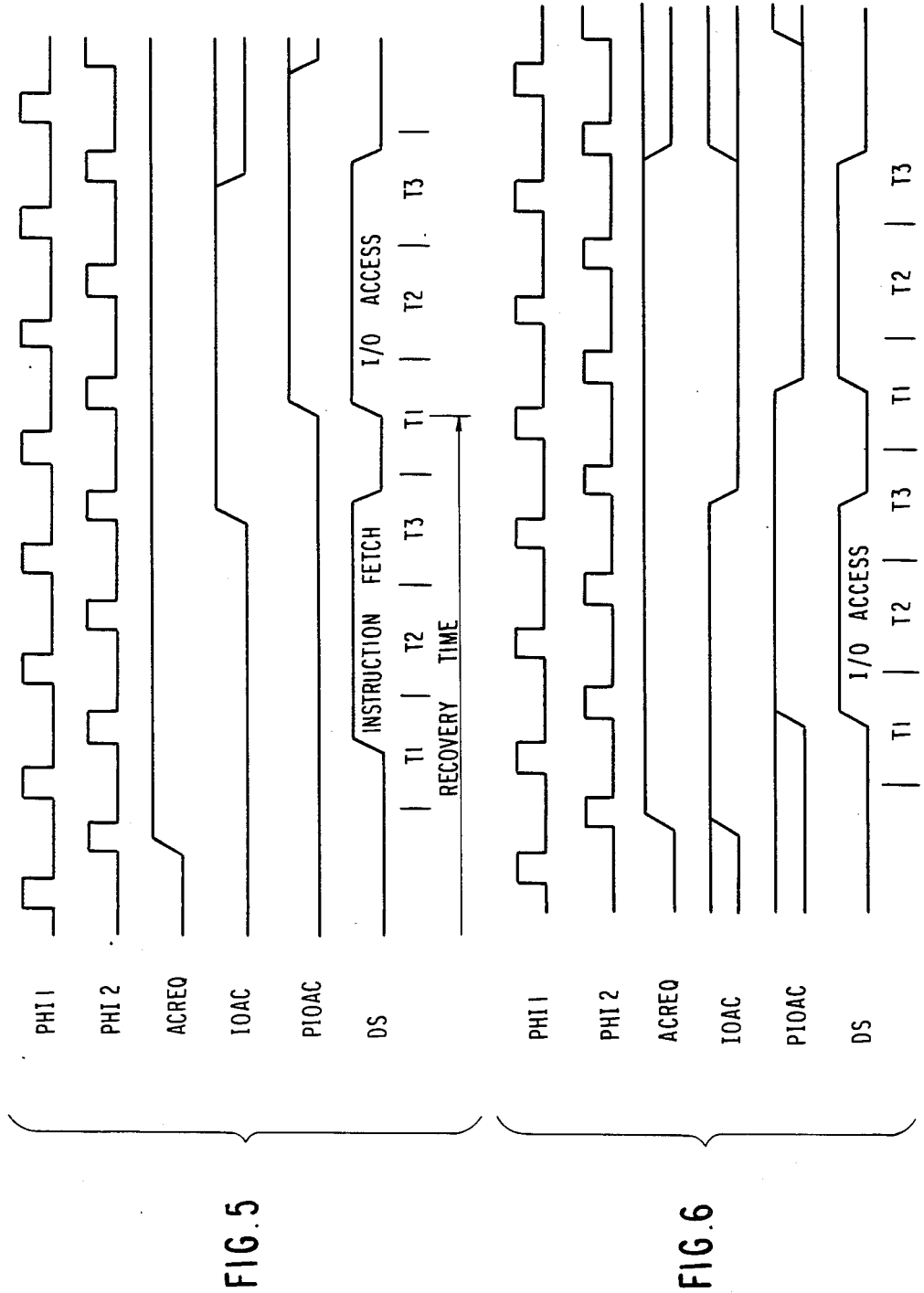

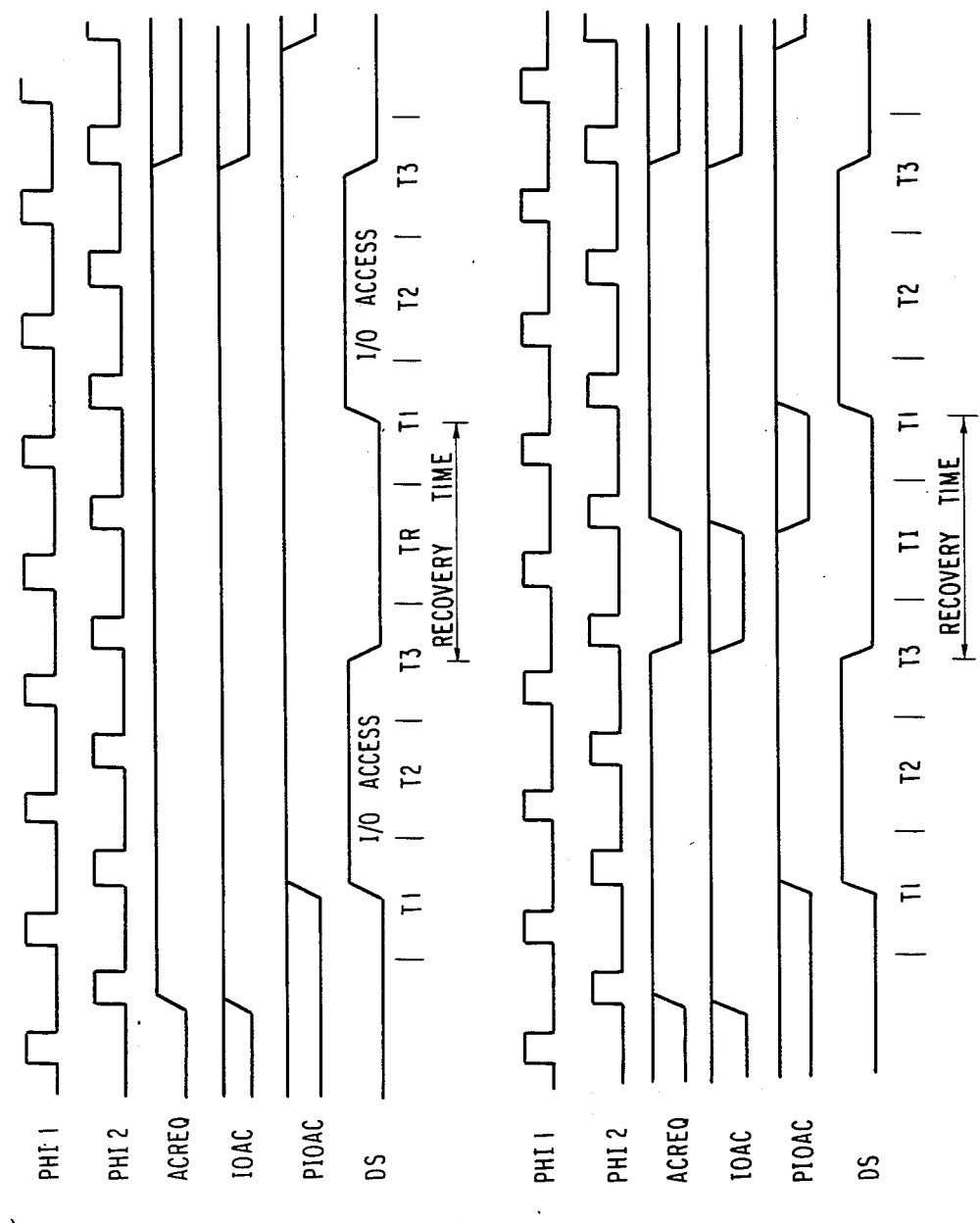

BUS STATE CONTROL CIRCUIT

BACKGROUND OF THE INVENTION

The present invention relates to a bus state control circuit of a microprocessor, and particularly to a bus state control circuit provided within a microprocessor to which an input-output control (peripheral control) IC is coupled by a bus.

Access by a microprocessor to an input-output control IC, such as a communication control IC and a magnetic disk control IC, has been made heretofore by executing input-output instructions. Ordinarily there is no problem with the "time for recovery" of the input-output control IC, i.e. the period of time between the end of one access and the start of a subsequent access, even when the same input-output control IC is accessed successively according to predetermined instructions, since the operating frequency of the microprocessor is low and an instruction fetch operation to retrieve the next instruction invariably comes in between input-output accesses.

FIG. 1 is a timing chart relating to an external access in the case when a microprocessor successively executes input-output instructions in a conventional manner. A strobe signal DS is used for reading and writing data, and it signifies the time when access is possible. The "time for recovery" is seen as the period between the point in time when the strobe signal turns inactive and the point in time when it turns active again for accessing the new input-output control IC. As shown in FIG. 1, since the instruction fetch cycle is inserted between the subsequent input-output access cycles, a long recovery time is obtained, even if the same input-output control IC is successively accessed.

Along with improvements in the integration capability of LSI, the performance and function of microprocessors currently are approaching those of minicomputers and medium-sized general purpose computers. Improvements in the technologies for manufacturing microprocessor elements and the introduction of a pipeline structure in microprocessor architecture, has contributed to this advance.

With the improvement in microprocessor architecture, the ratio of external access, i.e., the so-called "bus access ratio", is increased to a very significant degree. In other words, processes such as instruction fetching, instruction decoding, operand access and instruction execution, which previously have been processed serially, now can be executed in parallel due to the pipeline structure of the microprocessor architecture. By the same token, as to operand access, the reading of an operand necessary for an instruction subsequent to a given instruction which is now being executed and the writing of an operand contained in an instruction which was already completed is successively required.

Also, as to input-output instructions, they are executed successively for the same input-output control IC, the input-output access cycles may sometime occur successively without insertion of the instruction fetch cycle. This causes a problem in that the time for recovery cannot be secured, because the period of time between the end of one access and the start of the subsequent access become short.

A system in which software is prepared so that input-output instructions may not be executed successively is one approach to solving the aforesaid problem. Such system, however, must consider factors relating to hardware such as the pipeline structure of a given microprocessor, the degree of parallel execution of instructions, the clock frequency and the time for recovery of the input-output control IC. Consequently, there is a significant burden placed on a software developer. Moreover, even if a program solution is devised, the same program may not operate in another system which has different factors relating to hardware. Furthermore, even if the software allows a sufficient time to be taken between input-output instructions, so that it may operate in various systems, it will not efficiently operate systems which do not require much time for recovery.

As described above, there are many shortcomings in the system in which the time for recovery is secured by software.

Another solution may be found in a system in which hardware provides a fixed time period for securing the time for recovery that always is inserted between accesses made for input and output. This system has a shortcoming in that an unnecessary amount of time is needed when accesses for input and output are not successively made to the same IC. This results in a limitation on system performance.

SUMMARY OF THE INVENTION

An object of the invention is to provide a bus state control circuit capable of securing the recovery time of the input-output control IC.

Another object of the invention is to provide a bus state control circuit operable without any considerations or hardware such as the pipeline structure, the degree of parallel execution of instructions, the clock frequency and the recovery time of the input-output control IC.

Another object of the present invention is to provide a bus state control circuit capable of decreasing the burden on a software developer.

A further object of the present invention is to provide a bus state control circuit that operates effectively even when it is constructed with different hardware elements.

Yet another object of the present invention is to provide a bus state control circuit that is effectively operable even when access to the input-output control IC is not continuous.

According to the present invention, there is provided a bus state control circuit comprising, means for starting the access of an IC which requires a time for recovery after a predetermined time interval in the case when a previous access was made to the same IC, while starting the access immediately in the case when the previous access was made to the other IC, or when such access was made to the same IC but a predetermined time has passed. The starting means produces a strobe signal to indicate the time when access is possible.

Other objects and features of the invention will be clarified by the following explanation with reference to the drawings.

BRIEF DESCRIPTION OF THE DRAWINGS

FIGS. 5 through 8 are time charts of the embodiment of FIG. 2.

PREFERRED EMBODIMENT OF THE INVENTION

Figure 2:
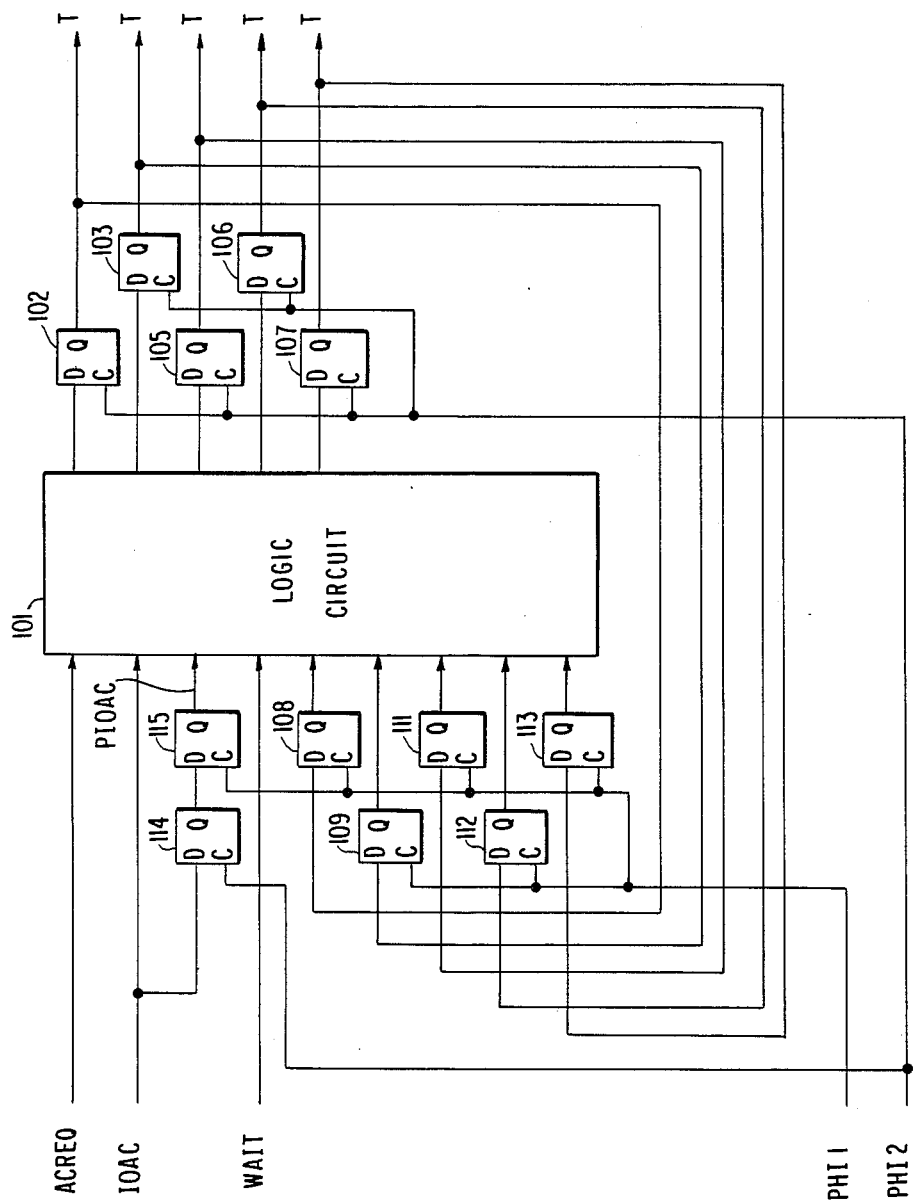
FIG. 2 is a circuit diagram of one embodiment of a bus state control circuit according to the present invention.

FIG. 2 shows a construction of one embodiment (two-phase clock system) of the bus state control circuit of the present invention.

D-type flip-flops 102 to 107 receive a first clock signal PHI1 and produce respective output signals TI, T1, T2, T3 and TR that show the current bus state. The outputs TI, T1, T2, T3 and TR show an idle state, a first state, a second state, a third state and a state for securing a recovery time, respectively. D-type flip-flops 108 to 112, which receive a second clock signal PHI2, are provided for delaying the current states TI, T1, T2, T3 and TR. D-type flip-flops 114 and 115 deliver a signal PIOAC, that is obtained by delaying an I/O access signal IOAC by one clock period. A combinational logic circuit 101 receives as inputs the signals obtained by delaying the output signals TI, T1, T2, T3 and TR of the current bus state. It also receives an access request signal ACREQ signifying a request for an access, an I/O access signal IOAC that shows that the access request signal ACREQ relates to an input-output when this signal is active, the signal PIOAC that is obtained by delaying the I/O access signal IOAC by one clock pulse, and a wait signal WAIT requesting an extension of an access cycle.

The access request signal ACREQ is generated during a predetermined period when a central processing unit (CPU) of a microprocessor requires to access an external element, such as an external main memory or a peripheral unit. For example, this ACREQ signal is generated by an instruction decoder when the decoder decodes an instruction for an external access (e.g. memory read, memory write, I/O read, I/O write).

The I/O access signal IOAC becomes active when the input-output control unit is to be accessed. This IOAC signal can be also generated by the instruction decoder.

The wait signal WAIT becomes active when a long access period is required. In this embodiment, when an access period longer than the period T1 to T3 is required, the WAIT signal becomes active during a desired period. For example, in a case that a low-speed memory or a low-speed peripheral unit is accessed, the WAIT signal becomes active.

Logic circuit 101 determines a subsequent bus state. The following table 1 is a truth table of the combinational logic circuit 101.

TABLE 1

| | Input | | | | Delayed Signals | | | | | Output | | | | |
|---|---|---|---|---|---|---|---|---|---|---|---|---|---|---|
| | ACREQ | IOAC | PIOAC | WAIT | TI | T1 | T2 | T3 | TR | TI | T1 | T2 | T3 | TR |
| S1 | 0 | — | — | — | 1 | 0 | 0 | 0 | 0 | 1 | 0 | 0 | 0 | 0 |
| S2 | 1 | — | — | — | 1 | 0 | 0 | 0 | 0 | 0 | 1 | — | — | — |
| S3 | — | — | — | — | 0 | 1 | 0 | 0 | 0 | 0 | 0 | 1 | 0 | 0 |
| S4 | — | — | — | 1 | 0 | 0 | 1 | 0 | 0 | 0 | 0 | 1 | 0 | 0 |
| S5 | — | — | — | 0 | 0 | 0 | 1 | 0 | 0 | 0 | 0 | 0 | 1 | 0 |
| S6 | 1 | 0 | — | — | 0 | 0 | 0 | 1 | 0 | 0 | 1 | 0 | 0 | 0 |
| S7 | 1 | 1 | 0 | — | 0 | 0 | 0 | 1 | 0 | 0 | 1 | 0 | 0 | 0 |
| S8 | 1 | 1 | 1 | — | 0 | 0 | 0 | 1 | 0 | 0 | 0 | 0 | 0 | 1 |
| S9 | 0 | — | — | — | 0 | 0 | 0 | 1 | 0 | 1 | 0 | 0 | 0 | 0 |
| S10 | — | — | — | — | 0 | 0 | 0 | 0 | 1 | 0 | 1 | 0 | 0 | 0 |

Next, the operation of the present embodiment will be described with reference to Table 1.

First, it is assumed that the current bus state is in the state TI (S1). When the access request signal ACREQ turns active, a transition is made to the state T1 (S2). Next, a transition is made to the state T2 (S3). If the wait signal WAIT is active in the state T2, the state T2 remains (S4), and if this signal is inactive, a transition is made to the state T3 (S5). This operation is conducted for securing an access time for the input-output control IC. When the access request signal ACREQ is inactive in the state T3, a transition is made to the state TI (S9). After the state T3 (S5), when the access request signal ACREQ is active and when the I/O access signal IOAC is inactive, a transition is made to the state TI (S6). In this embodiment, the input-output control unit is not accessed in S6, while an external memory is accessed. When the access request signal ACREQ is active and when the I/O access signal IOAC is active, the transition is made to the state T1 after the state T3 without the state TR if the PIOAC is inactive (S7). That is, when the previous access is not an I/O access, the state T3 is shifted immediately to the state T1 without recovery time. On the other hand, when the ACREQ signal is active and when the PIOAC is also active, a transition is node to the state TR from the state T3, if the IOAC is active (S8). That is, when the IOAC signals are successively activated at least twice, the state TR is necessarily inserted between the state T3 and the state T1. Thus, the recovery time is provided. A transition from the state TR to the state T1 is made unconditionally (S10).

Figure 3:
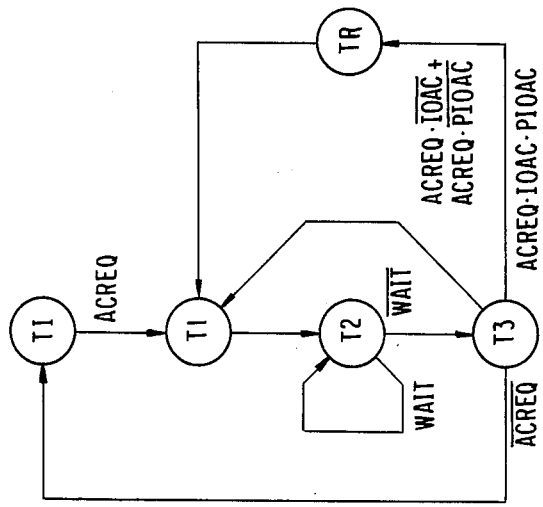
FIG. 3 is a state transition diagram of the embodiment of FIG. 2.

FIG. 3 is a state transition diagram of the above-described operation.

As indicated in table 1, the state TR is produced only when the I/O access is required successively. The period of the state TR may be preliminarily determined according to the recovery time of the input-output control unit. In this embodiment, one clock period is assigned to the state TR. The state TR is omitted when the previous access is not the I/O access. Further, the state TR can be omitted when a period longer than the recovery period is spent between the successive I/O accesses, because the D-type flip-flop 115 is reset.

Figure 1:
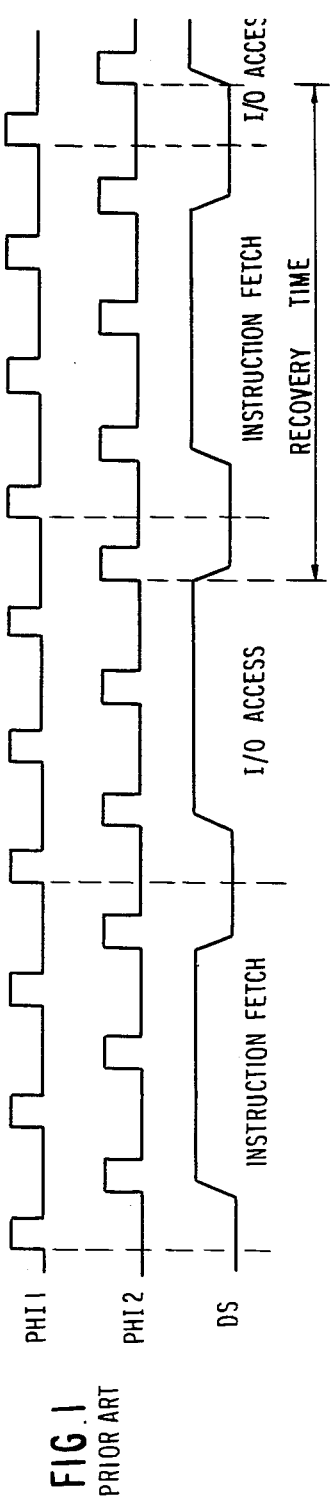
FIG. 1 is a time chart of a bus in the case when a sequential processing type microprocessor gives successive input-output instructions according to a conventional circuit.
Figure 4:
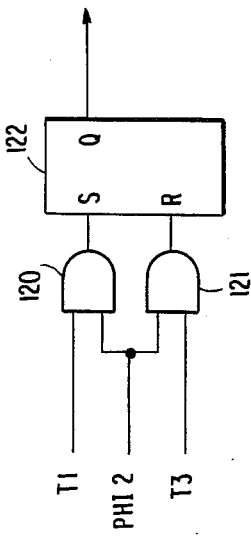
FIG. 4 is a circuit diagram of a strobe signal generating circuit.

An actual strobe signal is provided by using the state T1 and the state T3 as shown in FIG. 4. Each of D-type flip-flops 103, 105, 106 and 107 outputs a pulse signal, respectively. Each pulse signal is active in one cycle of the clock signal PHI1. The states T1, T2, T3 and TR are represented by the output pulse signals of flip-flops 103, 105, 106 and 107, respectively.

In FIG. 4, the output pulse signal representing the state T1, that is the pulse signal from the flip-flop 103, is applied to an AND gate 120, while the output pulse signal (T3) from the flip-flop 106 is applied to an AND gate 121. These two AND gates are controlled by the clock signal PHI2. An output of the AND gate 120 is connected to a set terminal (S) of a set-reset type flip-flop 122. An output of the AND gate 121 is connected to a reset terminal (R) of the flip-flop 122. The flip-flop 122 activates a strobe signal (DS) when both the signal (T1) and the PHI2 are received by the AND gate 120 and inactivates the strobe signal (DS) when the signal (T3) and the PHI2 are received the AND gate 121. Thus, the strobe signal (DS) is generated from the input timing of the signal (T1) till the input timing of the signal (T3).

In this embodiment of the present invention, the strobe signal is activated in the states T1, T2 and T3 when the PIOAC signal is inactive. The strobe signal is activated in the states T1, T2, T3 and TR when the PIOAC signal is activated, because the reset timing of the flip-flop 122 is delayed by inserting the state TR (recovery time).

FIG. 5 is a time chart for the case when a memory access is made consecutively to an input-output access. The chart shows that the transition from the state T3 of a memory access cycle is made to the state T1 of an input-output access cycle. FIG. 6 is a time chart for the case when the input-output access is made consecutively to the memory access. The transition is made from the state T3 of the input-output access cycle to the state T1 of the memory access cycle. FIG. 7 is a time chart for the case when the input-output access is made successively. The chart shows that a transition is made once from the state T4 of an initial input-output access cycle to the state TR for securing the recovery time prior to the transition to the state T1 of a subsequent input-output access cycle. FIG. 8 is a time chart for the case when input-output access cycles are consecutive with the state T1 inserted in between. It is shown that the recovery time is secured in this case without passing through the state TR.

In the embodiment described above, a one-clock interval is assigned to the state for securing the recovery time. It may happen that the one-clock interval is insufficient for securing the time for recovery of the input-output control IC, due to such factors as the clock frequency of a microprocessor and the number of clocks for the bus access cycle. In this case, the recovery time can be secured easily by constructing the bus state control circuit so that the state for securing the recovery time is increased as required and that, when an input-output access cycle is successive, a subsequent input-output access is started after the state thus increased is passed through. In order to extend the state TR according to the required recovery time, the logic circuit 101 may be modified. For example, a delay gate for delaying the transition from the state TR to the state T1 is added in the logic circuit 101. The logic circuit 101 can be formed by a well known random logic circuit design.

As described above, with the present invention, the time for recovery of an input-output control IC can be secured with only the inevitable minimum deterioration in performance of a microprocessor merely by delaying the start of a subsequent bus cycle when bus cycles for input and output are successive. The invention uses a system wherein a first signal showing that an access request signal is for an input-output device and a second signal showing that an access just before said signal was for the input-output device are inputted together in a bus state sequence. Also a state for securing the recovery time is inserted only in the case when the previous access was for the input-output device and accesses for the input-output device take place consecutively Further, according to the present invention, the strobe signal can be used as an I/O read strobe signal or an I/O write strobe signal. When a memory requiring the recovery time is employed, the present invention is also applied thereto. In this case, the inverted IOAC signal may be inputted to the flip-flop 114. A memory access signal may be used as the IOAC signal.

What is claimed is:

1. A bus state circuit responsive to first clock signals, access request signals, second clock signals and input-output device access signals, comprising:
    first delay means which outputs a plurality of bus state signals in response to a first clock signal;
    second delay means coupled to said first delay means for generating a plurality of second delay signals corresponding to the output of said first delay means in response to said second clock signals;
    third delay means responsive to said device access signal for generating third delay signals for a predetermined time period determined by the recovery time of said input-output device; and
    logic means connected to said first delay means and said second delay means, and being responsive to said access request signals and said input-output device access signals, for deciding next bus states and supplying signals representing such states to said first delay means in response to the outputs of said second delay means, said access request signal, and said second and third delay signals.

2. A bus state control circuit according to claim 1, wherein said first delay means comprises a plurality of delay circuits.

3. A bus state control circuit according to claim 1, wherein said first delay means are D-type flip-flops.

4. A bus state control circuit according to claim 1, wherein said second delay means and said first delay means are comprised of an equal number of D-type flip-flops.

5. A bus state control circuit according to claim 1, wherein said third delay means is comprised of a first D-type flip-flop operable in response to said first clock signal and a second D-type flip-flop serially connected to said first D-type flip-flop and operable in response to said second clock signal.

6. A bus state control circuit comprising:
    first means for storing an access signal indicating a first accessing to an input-output device or a second accessing to a main memory for a first time period;
    second means for discriminating whether said stored signal in said first means indicates the first or second accessing;
    third means, in response to receipt of a new access signal, for starting the accessing to the input-output device after a first time period determined by the recovery time of said input-output device when said stored signal indicates the first accessing; and
    fourth means, in response to receipt of the new access signal, for starting the accessing to the input-output device immediately when said stored signal indicates the second accessing or indicates the first accessing and at least said first time period has passed.

* * * * *